United States Patent Office 3,117,148
Patented Jan. 7, 1964

3,117,148
BUTADIENE IRON SUBGROUP TRICARBONYL HYDROHALIDE COMPOUNDS AND THEIR PREPARATION
Kryn G. Ihrman, Oak Park, and Thomas H. Coffield, Farmington, Mich., assignors to Ethyl Corporation, New York, N.Y., a corporation of Virginia
No Drawing. Filed Aug. 9, 1961, Ser. No. 130,245
6 Claims. (Cl. 260—439)

The present invention relates to coordination compounds in which a transition metal is linked by coordinate bonds to electron donor groups.

Among the objects of the present invention is the provision of novel compounds of the above type, as well as methods for preparing these new compounds.

The above as well as additional objects of the present invention will be more clearly understood from the following description of several of its exemplifications.

It has been discovered that certain coordination compounds of the iron subgroup metals are peculiar in that they can be made to form hydrohalide adducts of good stability and apparently of novel structure and characteristics. This is illustrated in the following example. (All parts in this as well as the remaining examples are by weight unless otherwise specified.)

Example I

Into a solution of 58 parts of butadiene iron tricarbonyl in 3200 parts of carbon tetrachloride was bubbled a stream of hydrogen chloride gas, while the solution was kept at a temperature of 20° C. by means of a cooling jacket and a stirrer. The bubbling was also adjusted to keep the temperature from rising to any appreciable degree at the bubbling site. With such adjustment the bubbled in gas was completely absorbed during the first few minutes of bubbling so that the bubbles did not reach the surface of the reaction mixture until about 5 minutes of bubbling was completed. The bubbling was continued for four hours, the 20° C. temperature being maintained throughout this time.

A white solid gradually precipitated during the bubbling, and was filtered off when the reaction was completed. The filtrate contained the adduct in dissolved condition, and was evaporated to dryness in vacuo. The evaporation residue was sublimed at 0.05 millimeter of mercury, at room temperature to give 25 parts of a light yellow crystalline sublimate melting at 58–60° C., and decomposing rapidly above its melting point.

The rate of decomposition of the sublimate diminishes as the temperature drops. Below its melting point, the decomposition becomes tolerable and at about 35° C. the compound will retain a good purity for many days. Where the temperature is 20° C. or below, decomposition is so slow that it can be ignored.

When pure, the crystals analyzed carbon—36.8 percent; hydrogen—3.28 percent; chlorine—15.6 percent; and iron—24.3 percent. This indicates that the product is $C_7H_7O_3ClFe$ which requires carbon—36.5 percent; hydrogen—3.14 percent; chlorine—15.4 percent; and iron—24.3 percent. Accordingly, it appears that one of the double bonds in the original butadiene iron tricarbonyl has disappeared and the product has the following structure

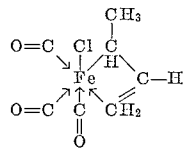

The infrared spectrum of the pure product has four metal carbonyl bands at 2041, 2000, 1961 and 1923 cm.$^{-1}$ respectively, a 1520 cm.$^{-1}$ band representing the coordinate linkage of the olefin bond, a 1385 cm.$^{-1}$ band for the methyl group and bands at 3086 and 3012 cm.$^{-1}$ representing the —CH stretch.

The product is quite soluble in organic solvents such as liquid hydrocarbons, chlorinated hydrocarbons and ethers, n-hexane, carbon tetrachloride, toluene, ethylene dichloride, diethyl ether and dioxane.

The above hydrochloride has different crystal forms which can be prepared under other conditions. Rapid crystallization from n-hexane or other hydrocarbon solvent at 10° C. or below produces fine brownish-yellow crystals. Rapid short path (2 cm. or less) sublimation at 30–35° C. and 0.05 to 0.10 mm. of mercury gives bright yellow crystals, and slow sublimation at 20° C. over a 5 cm. path yields stocky lustrous brown prisms.

Corresponding products are formed with other hydrogen halides as long as the halogen has an atomic number of at least 17 (HBr and HI) as well as with other iron subgroup metals (ruthenium and osmium) or with combination of other hydrogen halides and other iron subgroup metals. This is exemplified as follows.

Example II

The process of Example I is repeated except that hydrogen bromide is used in place of hydrogen chloride. A darker colored product is recovered.

Example III

Example I is repeated, this time substituting n-hexane for the carbon tetrachloride and butadiene ruthenium tricarbonyl for the corresponding iron compound, the reaction temperature being also held at 10° C. rather than 20° C. The hydrogen chloride adduct of butadiene ruthenium tricarbonyl is obtained by crystallization from the liquid portion of the reaction mixture at −10° C.

The ruthenium reactant, and the corresponding osmium reactant are conveniently prepared by simply reacting any of their carbonyls with butadiene at a temperature of about 100° C. for 2 to 10 hours and vacuum distilling the desired material as a relatively high boiling ingredient. The various hydrohalide products of the present invention have in general different stabilities. The hydrochlorides are more stable than the hydrobromides which in turn are more stable than the hydroiodides. Also, the ruthenium compounds are less stable than the iron compounds and the osmium compounds less stable than the ruthenium compounds. However, they are all soluble in organic solvents, can be prepared by using a reaction temperature of 20° C., and are all fairly inert to oxygen and water.

Because of this comparative stability, these hydrohalides provide a good source of divalent metal for chemical reducing reactions and as antioxidant additives. Natural rubber, neoprene rubber, polyethylene, and polypropylene are all made more resistant to weathering by incorporating in them, as by milling, 0.5 percent butadiene iron tricarbonyl hydrochloride or any of the other hydrohalides of the present invention.

The hydrohalides of the present invention also have the ability of improving the combustion of fuels such as home heating fuel oil and rocket propellants. For such use only a 0.1 percent concentration of these hydrohalides is sufficient and they readily dissolve in fuel oil as well as in hydrazine, methyl hydrazine, unsymmetrical dimethyl hydrazine, diesel fuel, and jet fuels including those of the kerosene type.

Another field of use for the hydrohalides is in the treatment of swimming pool water to keep the bacteria count down and discourage the growth of algae. These compounds are sufficiently biocidal to be effective for this when the water is circulated through a quantity of hydrohalide. Very little of the hydrohalide dissolves in the water but the little that does has a prolonging biocidal effect that adds to the results produced by the simple contact with the material during the above circulation.

The hydrohalides of the present invention are also antiknock agents, but because of their relatively low volatility are best used in low concentration, e.g., one gram per gallon either as the sole antiknock agent in gasoline or in combination with other antiknock agents such as lead alkyls. Higher concentration can be used in engines that have high temperature (above 50° C.) intake manifolds as in air-cooled engines, or in fuel injection type gasoline engines.

Alkyl-substituted butadienes such as isoprene and decadiene-1,3 behave like butadiene in that they form iron subgroup metal tricarbonyls which in turn are converted to hydrohalides having properties corresponding to those of the unsubstituted butadiene compounds. The same reaction technique is used to make these hydrohalides, and as in the above examples, no precaution need be taken to exclude oxygen or moisture from the reaction mixture. The reacting hydrogen halide gas can for example be a moist material prepared from aqueous hydrohalogen acid. The moisture thus introduced into the reaction mixture tends to collect as a separate phase that does not interfere with the reaction, although it will dissolve some ferrous chloride for example, formed when the iron compound is made. Where the reaction solvent is methanol or similar material that dissolves water, so much water may be added that the butadiene metal tricarbonyl reactant precipitates out and does not react. This should be avoided.

Reaction temperatures for making the hydrohalides can vary down to about 0° C., but a preferred temperature range is from 10 to 20° C.

Instead of bubbling hydrogen halide gas into the reaction mixture to form the hydrohalides of the present invention, an aqueous solution of the hydrogen halide can merely be stirred with an immiscible solution of butadiene metal tricarbonyl. To keep from having too violent an initiation, the hydrogen halide solution can initially be very dilute—one percent by weight, and concentrated acid can be slowly added after about 15 to 30 minutes of reaction. Alternatively, stirring can be started only after an interfacial reaction has been under way for such a period of time, when stronger aqueous acid is used.

The hydrohalides of the present invention are unusual in that they contain halogen apparently bound to metal, yet are fairly volatile. Also, there seems to be some peculiarity of the butadiene molecule that enables their formation. Bicyclo-[2,2,1]-hepta-2,5-diene iron tricarbonyl does not form a hydrohalide, and neither does ethyl sorbate iron tricarbonyl, although both have diolefin structures similar to butadiene.

Butadiene iron tricarbonyl will form acid adducts with HCN and acetic acid, in the same way as and corresponding in structure to the hydrohalides. Similar non-volatile products result from the reaction of butadiene iron tricarbonyl with the other halogens. These halogen adducts can be used to indicate the presence of moisture, alcohols, ketone or aldehyde in other materials such as hydrocarbons. The gas evolution indicates the presence, and since it is accompanied by conversion of the moisture, alcohol or the like to gaseous and solid products, these materials are simultaneously removed from any liquid tested.

Obviously, many modifications and variations of the present invention are possible in the light of the above teachings. It is, therefore, to be understood that within the scope of the appended claims, the invention may be practiced otherwise than as specifically described.

We claim:

1. A butadiene iron subgroup tricarbonyl hydrohalide wherein the halogen is selected from the class consisting of chlorine, bromine and iodine.

2. Butadiene iron tricarbonyl hydrochloride.

3. A method which comprises reacting a butadiene iron subgroup tricarbonyl with hydrogen halide whose halogen is selected from the class consisting of chlorine, bromine and iodine in a compatible organic solvent for the butadiene iron subgroup tricarbonyl at a temperature below that at which the hydrohalide of said compound decomposes as rapidly as it is formed.

4. A method which comprises reacting butadiene iron tricarbonyl with hydrogen chloride in a compatible organic solvent at a temperature below about 60° C.

5. A butadiene iron tricarbonyl hydrohalide wherein the halogen is selected from the class consisting of chlorine, bromine and iodine.

6. A method which comprises reacting a butadiene iron tricarbonyl with hydrogen halide whose halogen is selected from the class consisting of chlorine, bromine and iodine in a compatible organic solvent for the butadiene iron tricarbonyl at a temperature below that at which the hydrohalide of said compound decomposes as rapidly as it is formed.

No references cited.